No. 790,820. PATENTED MAY 23, 1905.
D. E. DOZER.
FLUE CUTTER.
APPLICATION FILED APR. 11, 1904.
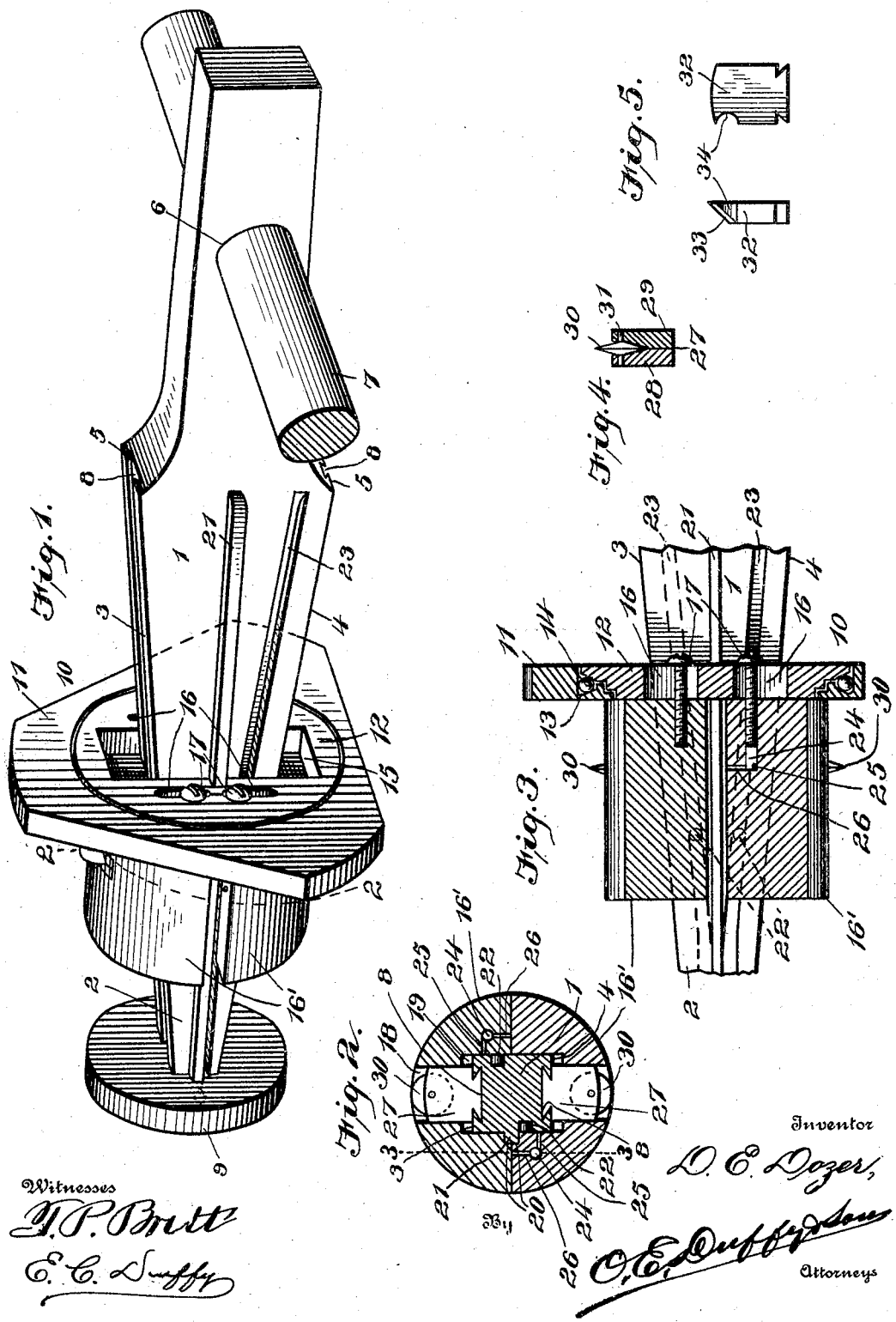

No. 790,820.

Patented May 23, 1905.

UNITED STATES PATENT OFFICE.

DAVID E. DOZER, OF DEFIANCE, OHIO.

FLUE-CUTTER.

SPECIFICATION forming part of Letters Patent No. 790,820, dated May 23, 1905.

Application filed April 11, 1904. Serial No. 202,713.

*To all whom it may concern:*

Be it known that I, DAVID E. DOZER, a citizen of the United States, residing at Defiance, in the county of Defiance and State of Ohio, have invented certain new and useful Improvements in Flue-Cutters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to pipe and flue cutters, and has for its object to provide a device for cutting tubes or flues from boilers.

With this object in view my invention consists in the novel construction and arrangement of parts of the device, but particularly in the novel construction of the dies, the main bar, the construction of the sliding die-carrying sections, and the sliding plate.

My invention has for its object particularly to provide a device which is an improvement over the flue-cutter shown in United States Letters Patent No. 747,320, dated December 15, 1903.

Referring to the accompanying drawings, Figure 1 is a perspective view of the flue-cutter. Fig. 2 is a vertical cross-section taken on the line 2 2 of Fig. 1. Fig. 3 is a vertical longitudinal section through Fig. 1 along the line as indicated by 3 3 of Fig. 2. Fig. 4 is a vertical section through one of the cutting-dies. Fig. 5 shows an end and side elevation of a cutting-die which I can employ in connection with my device for cutting small tubes.

Like numerals of reference indicate the same parts throughout the several figures, in which—

1 indicates the main bar, having a small tapered end 2, said bar forming two inclined planes 3 and 4. From the point 5 the said bar may be of any form or shape, but preferably as shown, and an opening 6 is formed therein for the reception of the lever 7, a portion of which is shown in Fig. 1.

The tapered or wedge portion of the main bar 1 is provided, preferably, with a dovetail groove 8 in each of the inclined sides 3 and 4, and the forward end of said bar carries a small circular plate 9, secured thereon by a nut or other suitable fastening means.

10 indicates the sliding plate, which is composed of two independent members 11 and 12, the outer or revolving member 11 being preferably shaped as shown and the inner sliding member 12 being circular. A ball-race 13 is formed in the outer member 11 and a series of balls 14 is carried in said race, the said members 11 and 12 being rabbeted, as shown in Fig. 3, so that both faces of the members 11 and 12 are perfectly flush. The said inner member 12 is provided with an oblong opening 15 and a pair of slots 16 on each side of said opening. The oblong opening in said member 12 is for the purpose of allowing the said member to slide freely on the main bar, and the slots 16 are for the purpose of allowing bolts or pins 17 to pass through said plate 12 and to engage the sliding die-carrying section 16'. Said die-carrying sections 16' are, as shown in Fig. 2, formed in two arches, and when the said two sections are together the said sections form a comple circle, as shown clearly in Fig. 2. 18 indicates a vertical slot in the said sections 16', and the interior of said sections is cut out at 19 in order to conform to the main bar 1, as shown in Fig. 2. The said sections 16' are also provided on their inner sides with a small rectangular cut-away portion 20, as shown in Fig. 2, the said cut-away portions 20 forming a groove to conform to the tongue 21, formed on one side of the main bar 1, as shown in Figs. 1 and 2. Said sections 16' are also provided on their interiors with a pin 22, which is adapted to extend within a groove 23 in each side of the main bar 1, as shown in Figs. 1 and 2.

Referring to Fig. 3, it will be observed that the openings in the sections 16' for the reception of the bolts 17 extend within said sections some little distance beyond the end of the bolt 17, forming a small chamber 24, as clearly shown. Two small ports 25 and 26 lead from said chamber 24 to the groove 19 in said sections and to the face of said section, as shown in Fig. 2. This chamber 24 is for the purpose of carrying a lubricating-oil in order to lubricate the main bar 1, so as to facilitate the action of the die-carrying sections thereon, and to lubricate the metal tube where dies are cutting and to prevent heating of dies.

It will be noted by referring to Fig. 2 that the vertical slots 18 in the die-carrying sections are for the purpose of carrying a die 27, the inner end thereof being dovetailed, as shown, in order to operate within the dovetail groove 8, formed in the inclined planes 3 and 4 of the main bar 1. Said dies 27 or, strictly speaking, the die-carriers 27 are each formed in two sections 28 and 29, as shown in Fig. 4. A small rotary cutter or die 30 is carried between said sections 28 and 29, as shown in Fig. 4, the said sections being provided with a bearing for the reception of the small journal 31, which is preferably formed on the rotary cutter or die 30.

Referring to Fig. 5, it will be observed that I show a different form of die, which can be employed in connection with my device for cutting small tubes or flues where great power or cutting ability is not needed. In this construction the dies 32 are formed in one piece, being dovetailed, the upper or cutting edge thereof being beveled at 33 and the forward edge of said die being cut out at 34 in order to facilitate the cutting action of the die.

Having thus described the several parts of my invention, its operation is as follows: The parts are assembled as shown in Fig. 1, and when it is desired to cut a tube or flue from a boiler the small end of the wedge 1, carrying plate 9, is inserted in the tube to be cut, the die-carrying sections 16' having first been moved down so that the forward faces of said sections 16' are in contact with the rear face of the plate 9, in which position the plate 9 and the two sections 16' are substantially the same in diameter. When in this position, the dies are entirely housed within the said sections, as shown in Fig. 2, and the outer section 11 of the plate 10 bears against the outer cover of the boiler. A few blows on or a pressing against the other end of the main bar 1 will drive the wedge portion of said bar between the die-carrying sections 16', causing said sections to be spread apart and causing the dies to spread apart and to enter the tube or flue. The bar 7 is then inserted, as shown, and the device is revolved, which causes the dies to cut out the boiler-tube in a neat manner and without cracking the same. It will be observed that the plate 11 furnishes a solid bearing against the boiler when driving the wedge into the tube, and the device is capable of revolving without any friction other than that which is caused by the dies cutting the tube.

The advantages derived from the specific construction as shown and described are as follows: By reason of the construction of the tongue 21 on the bar 1 and the grooves 23 in said bar and the pins 22 in the sections 16' the said sections and dies can operate along the bar 1 uniformly, and both dies can thereby be housed equally or extended equally, as the case may be. The particular arrangement of the die-carriers makes it possible to instantly remove the rotary cutter or die. The particular construction of the plate 10, made in two sections 11 and 12, greatly facilitates the operation of the device, as all friction of said plate against the outside of the boiler is obviated and the friction between the central section 12 and the outer section 11 is reduced to a minimum by reason of the ball-bearings 14.

Referring again to the grooves 23, it will be noted that a portion thereof nearest the disk 9 is parallel with the tongue 21, so that as the die-carrying sections 16' meet each other the said grooves 23 will guide the said sections without causing them to bind against each other, while the inclined surfaces 3 and 4 will cause the dies to be housed, as shown in Fig. 2.

Having thus fully described my invention and set forth the advantages thereof, I do not wish to be understood as limiting myself to the exact construction as herein set forth, as various slight changes might be made therein by those skilled in the art which would fall within the limit and scope of my invention, and I consider myself clearly entitled to all such changes and modifications.

What I claim as my invention, and desire to secure by Letters Patent of the United States, is—

1. In a tube-cutter, the combination with the main bar having a wedge portion, of a plate through which said bar passes, semicircular die-carrying sections secured to said plate, dies removably secured in said die-carrying sections, and means for guiding said carrying-sections to uniformly house said dies, substantially as described.

2. In a tube-cutter, the combination with the main bar having a wedge portion, of a plate through which said wedge portion passes, said plate comprising an outer section and an inner revoluble section, die-carrying sections secured to said plate and dies carried by said sections to uniformly house said dies, substantially as described.

3. In a tube-cutter, the combination of the main bar having a wedge portion, die-carrying sections adapted to operate on said wedge portion, die-carriers in said die-carrying sections, said die-carriers comprising two sections, a rotary cutting-die carried between the sections of said die-carriers and means for housing said die-carriers, and dies within the said die-carrying sections, substantially as described.

In testimony whereof I affix my signature in presence of two witnesses.

D. E. DOZER.

Witnesses:
F. W. MANSFIELD,
D. E. HARRISON.